March 6, 1962  J. C. LONG  3,023,690
AIR MOVEMENT CONTROL AND METHOD
Filed June 19, 1959  2 Sheets-Sheet 1
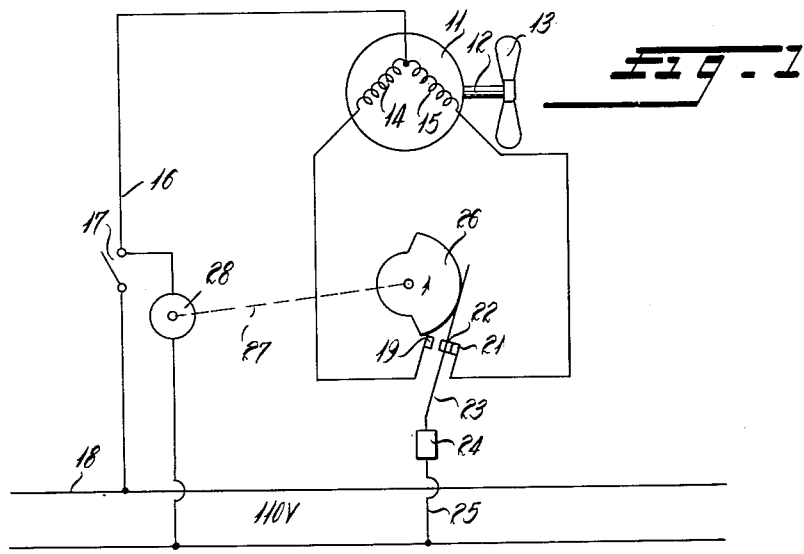
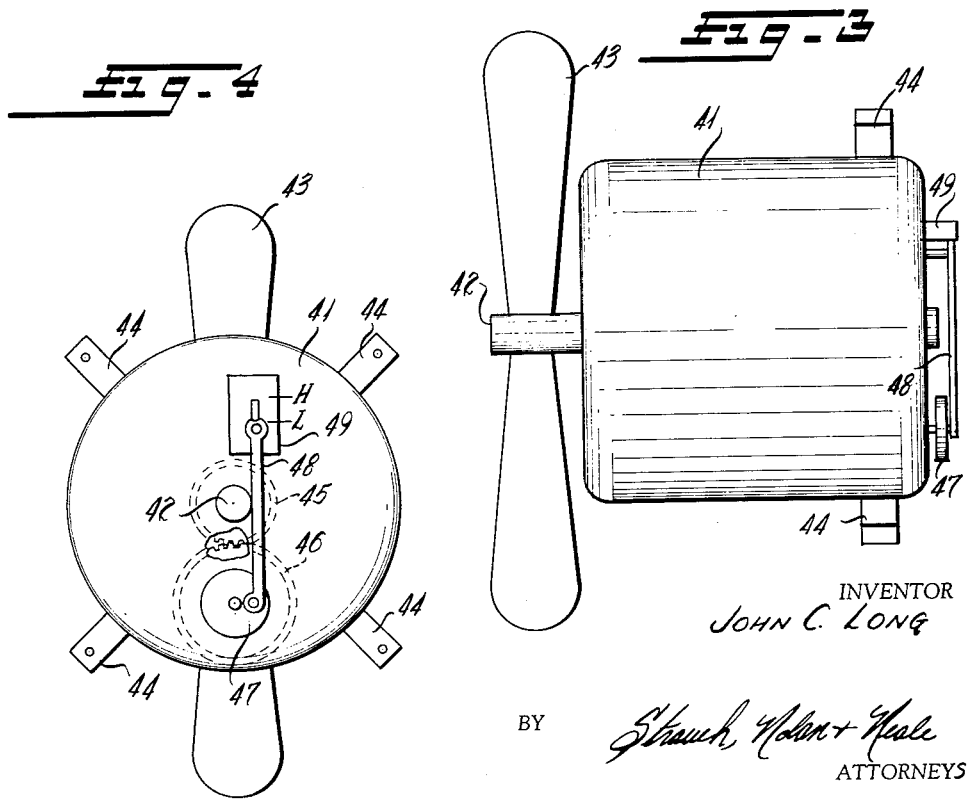
INVENTOR
JOHN C. LONG
BY
Strauch, Nolan + Neale
ATTORNEYS March 6, 1962 J. C. LONG 3,023,690
AIR MOVEMENT CONTROL AND METHOD
Filed June 19, 1959 2 Sheets-Sheet 2
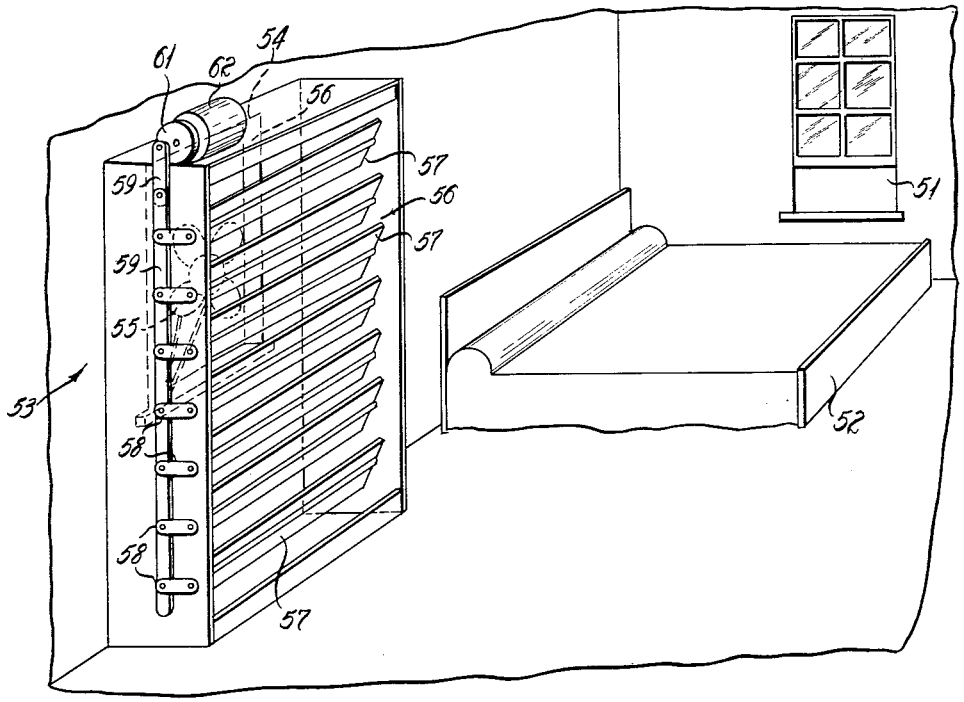
_Fig-3_
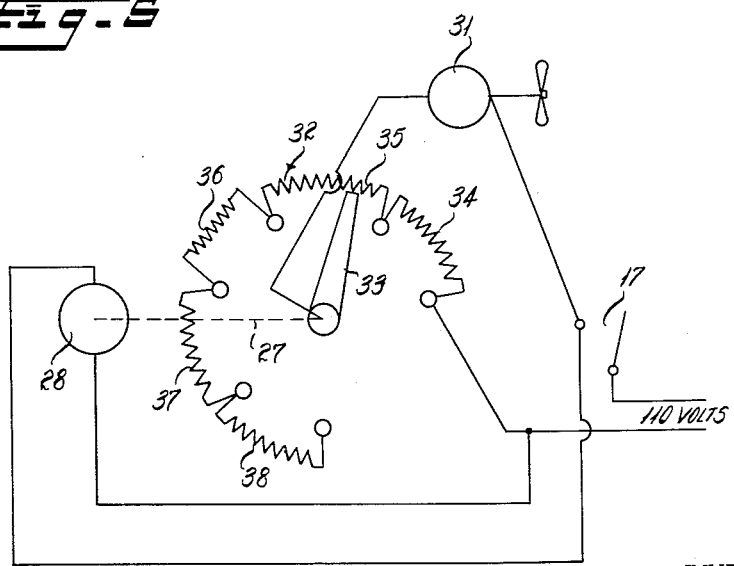
_Fig-2_
INVENTOR
JOHN C. LONG
BY Strauch, Nolan & Neale
ATTORNEYS

United States Patent Office 3,023,690
Patented Mar. 6, 1962

3,023,690
AIR MOVEMENT CONTROL AND METHOD
John C. Long, 90 Broad St., Charleston, S.C.
Filed June 19, 1959, Ser. No. 821,559
1 Claim. (Cl. 98—40)

This invention relates to systems and methods for simulating natural movement of air indoors and is particularly directed to special arrangements for controlling air moved by fans.

In warm climates and during the summer it has long been customary to use large exhaust fans to produce air movement. The difficulty with this is that such arrangements produce more or less constant drafts of air that frequently result in distress in the form of sore throats, aching joints and stiff necks.

It has been discovered that if these drafts can be regulated to occur at intervals or otherwise varied so as to simulate natural breezes the chances of attendant discomfort are considerably reduced. Therefore the present invention has been devised to accomplish this desirable simulation of natural air movement.

According to the present invention the movement of air may be varied as by controlling a fan speed regularly, either mechanically or electrically, or shutters may be periodically controlled to vary the air flow induced by a fan.

It is therefore the major object of the present invention to control movement of air by a fan to simulate natural air movement.

A further object of the invention is to provide a novel fan speed control mechanism wherein high and low speed operation of the fan is automatically and periodically selected.

It is a further object of the invention to provide a novel fan speed control arrangement wherein a cam driven by a motor operates a switch for periodically activating the high and low speed windings of the fan motor.

A further object of the invention is to provide a novel fan speed control wherein the speed control switch of the fan motor is periodically actuated through a cycle by means such as a cam driven by the fan motor.

Another object of the invention is to provide a novel control of movement of air in a room wherein a shutter assembly arranged in front of a fan is periodically driven to vary the air moved by the fan.

Further objects of the invention will appear as the description proceeds in connection with the appended claim and the annexed drawings wherein:

FIGURE 1 is a diagrammatic view of an electrically controlled fan speed arrangement;

FIGURE 2 diagrammatically shows a control circuit using a rheostat;

FIGURES 3 and 4 are rear and side views of a fan having another form of automatic speed control; and FIGURE 5 shows a manner of approximating natural ventilation of a room including an automatically adjustable shutter arrangement.

Referring to FIGURE 1 an electrical motor 11 has an output shaft 12 on which is mounted an air moving fan 13. This is preferably a large exhaust fan.

Fan motor 11 has internally low and high speed field windings 14 and 15 adjacent ends of which are connected by a common lead 16 through a switch 17 to one side 18 of the 110 volt service line. The other ends of windings 14 and 15 are electrically connected respectively to stationary switch terminals 19 and 21.

A movable switch contact 22 is mounted on a spring blade 23 that has an end anchored in a stationary support 24. Spring blade 23 and support 24 are conductive and connected by lead 25 to the other side of the service line.

A cam 26 of plastic or other non-conductive material mounted on a shaft 27 driven by a motor 28 bears against blade 23 which is normally biased to connect contacts 19 and 22. Motor 28 is connected in parallel to motor 11 across the service line when switch 17 is closed.

When switch 17 is closed both motors 11 and 28 operate continuously. Cam 26 periodically causes energization of the high and low speed windings of the motor 11 so that the speed of fan 13 and hence the movement of air thereby is automatically varied.

Cam 26 may be of any shape, for example as to cause several changes in fan speed during one rotation or to provide different timed periods of high and low speed fan operation.

FIGURE 2 illustrates an embodiment wherein the fan motor 31 is automatically varied in speed by a rheostat assembly 32 having a contact arm 33 driven by motor 28 over a series of contacts bridged by resistances 34—38 which may be of the same or different values so that any desired automatic speed variation cycle of the fan and therefore air movements may be obtained.

FIGURES 3 and 4 show a fan motor 41 having a shaft 42 on which is secured fan 43. The motor has mounting brackets 44.

Within the motor housing shaft 42 carries a gear 45 meshed with a gear 46 carrying an eccentric 47 pivotally connected by arm 48 to a two position switch 49 that connects the high or low speed windings of the fan to the line.

Thus when motor 41 is energized to rotate the fan the eccentric periodically moves the switch 49 between its high and low speed positions to control air speed and volume delivered by the fan.

FIGURE 5 discloses an embodiment wherein air movement is varied automatically by shutter movement rather than changes in fan speed.

The room disclosed in FIGURE 5 has an open air inlet window 51 disposed adjacent a bed 52 and an air movement control assembly 53 located adjacent an outlet window 54.

For purposes of the method of the invention the fans of the previous embodiments may be disposed at the outlet window.

In FIGURE 5, however, the fan 55 is electrically driven at a constant speed and it is located between the outlet 54 and a movable shutter assembly 56, with the fan so disposed as to move air toward the outlet.

The shutter assembly 56 comprises a series of pivoted louvers 57 having levers 58 rigid with their pivots connected pivotally to a rod assembly 59 pivotally connected eccentrically to a disc 61 on the shaft of an electric motor 62.

With the fan operating and the louvers open a constant movement of air is drawn across the bed. When motor 62 is also operated the louvers periodically open and close and the air movement across the bed is correspondingly varied. The air speed increases as the louvers move toward closed position. If desired the fan motor can be connected to drive eccentric 61 instead of the separate motor 62.

In all of the foregoing embodiments I am enabled to produce a variable movement of air that simulates natural breezes, a circumstance that is peculiarly conducive to rest and tranquility.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

Apparatus for simulating natural breezes comprising a fan assembly having an electric motor with high speed and low speed field windings and an armature coupled to a rotatable shaft carrying a plurality of air moving blades, an energizing circuit for said fan motor, a switch in said circuit for selecting energization of the respective windings, and means driven by the fan motor for operating said switch to cyclically drive said fan blades at successive high and low speeds.

References Cited in the file of this patent

UNITED STATES PATENTS

| | | |
|---|---|---|
| 697,448 | Coleman | Apr. 15, 1902 |
| 1,150,313 | Stauffer et al. | Aug. 17, 1915 |
| 1,695,527 | Braun | Dec. 18, 1928 |
| 2,124,716 | Sperry | July 26, 1938 |
| 2,196,308 | Johnson | Apr. 9, 1940 |
| 2,471,775 | Reece | May 31, 1949 |
| 2,800,851 | Kronrad | July 30, 1957 |

FOREIGN PATENTS

| | | |
|---|---|---|
| 603,737 | Great Britain | June 22, 1948 |